(12) United States Patent
Dinwoodie

(10) Patent No.: US 6,809,251 B2
(45) Date of Patent: Oct. 26, 2004

(54) INCLINED PHOTOVOLTAIC ASSEMBLY

(75) Inventor: Thomas L. Dinwoodie, Piedmont, CA (US)

(73) Assignee: Powerlight Corporation, Berkeley, CA (US)

(*) Notice: Subject to any disclaimer, the term of this patent is extended or adjusted under 35 U.S.C. 154(b) by 0 days.

(21) Appl. No.: 10/292,400

(22) Filed: Nov. 12, 2002

(65) Prior Publication Data

US 2004/0007260 A1 Jan. 15, 2004

Related U.S. Application Data

(63) Continuation-in-part of application No. 09/902,476, filed on Jul. 10, 2001, now Pat. No. 6,534,703.

(51) Int. Cl.[7] ...................... H01L 31/045; H01L 31/048
(52) U.S. Cl. ...................... 136/251; 136/246; 136/244; 136/291; 136/245; 52/173.3
(58) Field of Search ................. 136/251, 246, 136/244, 291, 245; 52/173.3

(56) References Cited

U.S. PATENT DOCUMENTS

| | | | |
|---|---|---|---|
| 5,059,296 A | * 10/1991 | Sherman | 204/229.8 |
| 5,316,592 A | 5/1994 | Dinwoodie | |
| 5,343,254 A | 8/1994 | Wada et al. | |
| 5,505,788 A | 4/1996 | Dinwoodie | |
| 5,573,600 A | * 11/1996 | Hoang | 136/248 |
| 5,746,839 A | 5/1998 | Dinwoodie | |
| 5,951,785 A | 9/1999 | Uchihashi et al. | |
| 6,046,399 A | 4/2000 | Kapner | |
| 6,061,978 A | 5/2000 | Dinwoodie et al. | |
| 6,148,570 A | 11/2000 | Dinwoodie et al. | |
| 6,313,394 B1 | 11/2001 | Shugar et al. | |
| 6,360,497 B1 | 3/2002 | Nakazima et al. | |
| 6,495,750 B1 | * 12/2002 | Dinwoodie | 136/251 |
| 6,501,013 B1 | * 12/2002 | Dinwoodie | 136/251 |
| 6,534,703 B2 | * 3/2003 | Dinwoodie | 136/251 |
| 6,570,084 B2 | * 5/2003 | Dinwoodie | 136/251 |
| 6,630,622 B2 | * 10/2003 | Konold | 136/246 |
| 2003/0164187 A1 | * 9/2003 | Dinwoodie | 136/251 |

FOREIGN PATENT DOCUMENTS

| | | | |
|---|---|---|---|
| JP | 403145168 A | | 6/1991 |
| JP | 6-314809 A | * | 11/1994 |
| WO | WO 01/63184 A1 | * | 8/2001 |

OTHER PUBLICATIONS

Shugar, Daniel S., "PowerLight Completes 50 kW of PV Systems in Wyoming," Press Release, Oct. 10, 1996, 2 pages.

Shugar, Daniel S, "PowerLight to Install Solar Electric Roof Tile Manufacturing Facility with NYSERDA Cost–Sharing," Press Release Mar. 21, 1997, 1 page.

Shugar, Daniel S, et al., "Photovoltaic Roof Tiles for Commercial Buildings," Solar Today, (Jul./Aug. 1996) 18–20.

* cited by examiner

*Primary Examiner*—Alan Diamond
(74) *Attorney, Agent, or Firm*—James F. Hann; Haynes Beffel & Wolfeld LLP

(57) ABSTRACT

A PV assembly comprises a base, having a length L, an upwardly extending PV module, having a length H, and a downwardly extending deflector. The PV module and the deflector are preferably secured to the base so that they are placeable at shipping and inclined-use angles. The module may be connected to the base by a living hinge. The deflector may comprise an outer surface having a solar reflectivity of at least about 0.2, and more preferably of at least about 0.7, whereby solar radiation contacting the outer surface may be redirected to an adjacent PV module to increase the power output of the adjacent PV module. The inclined-use angle of the PV module may be about 2° to 15° and a ground cover ratio of H/L may be about 0.6 to about 0.8 for increased power output.

37 Claims, 12 Drawing Sheets

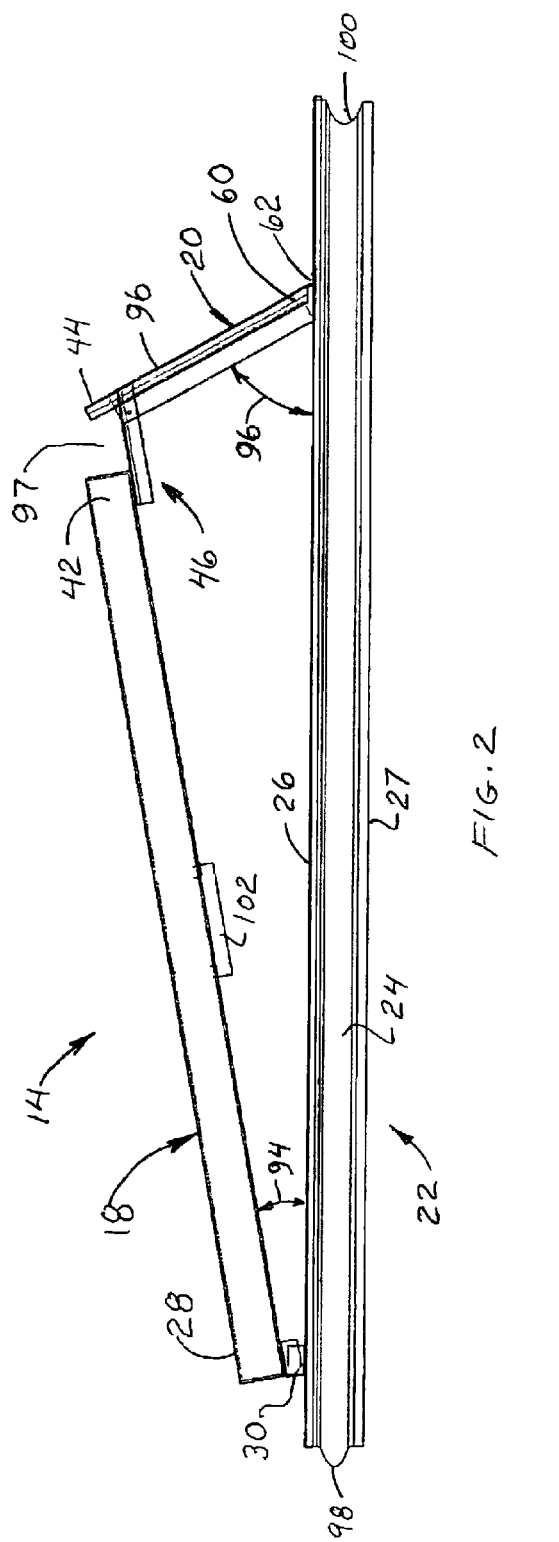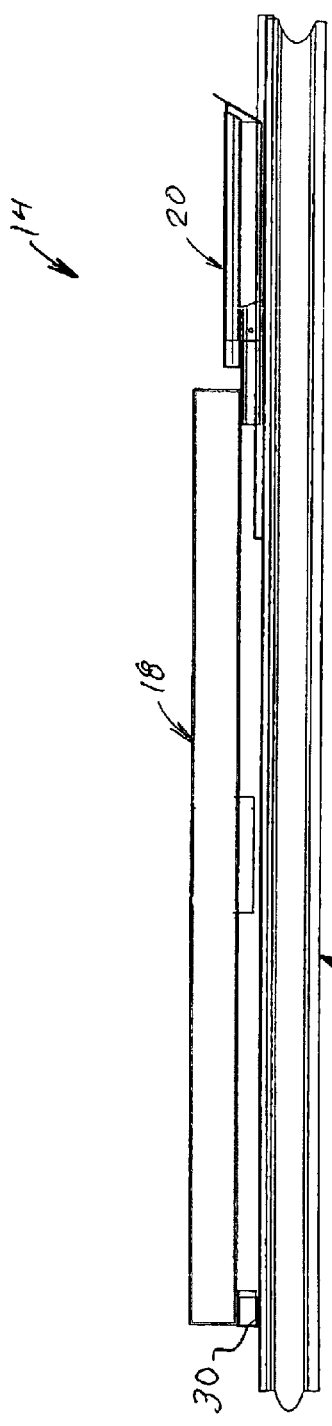

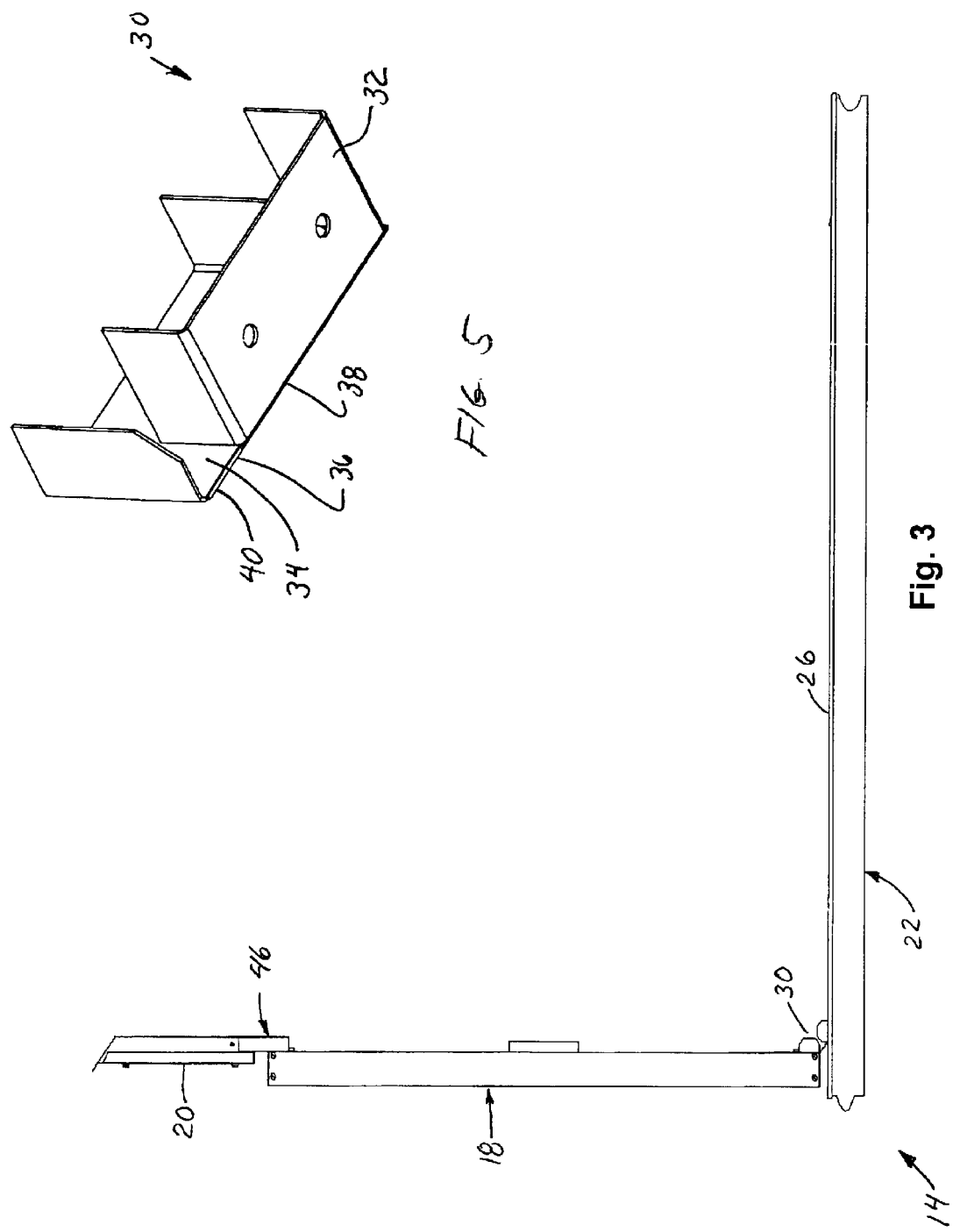

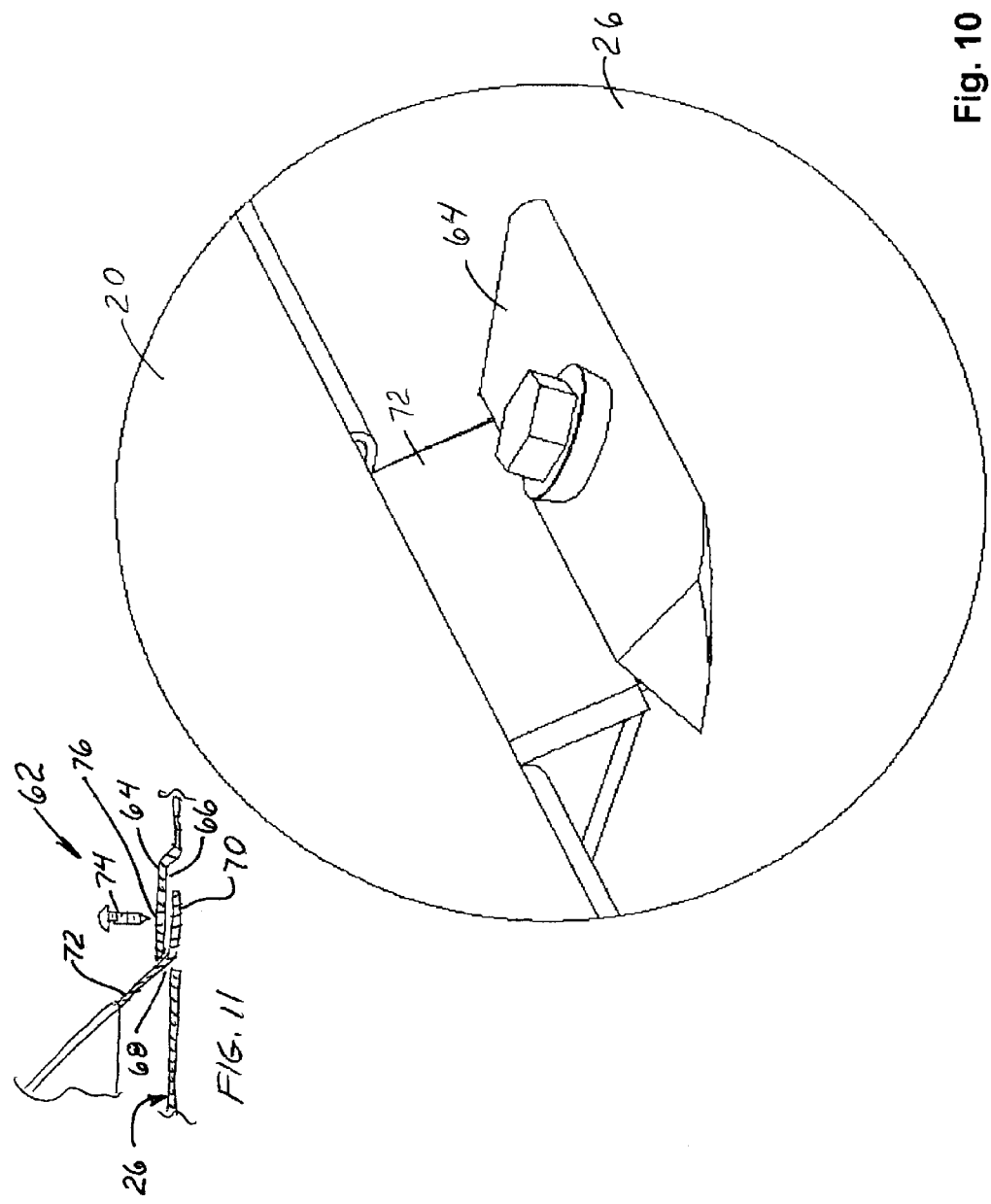

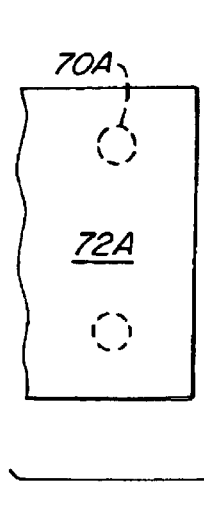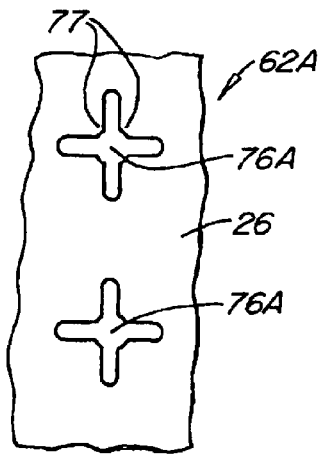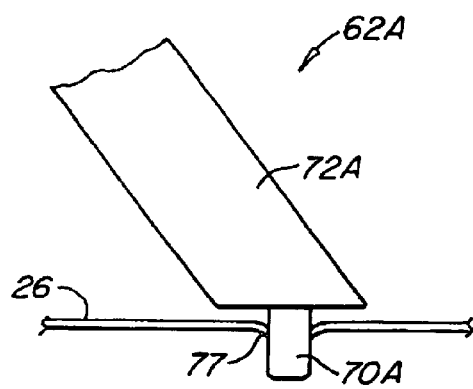
FIG. 12      FIG. 13
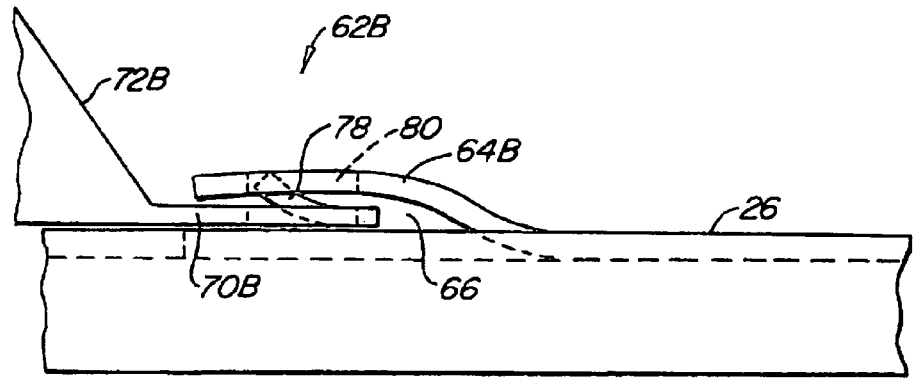
FIG. 14
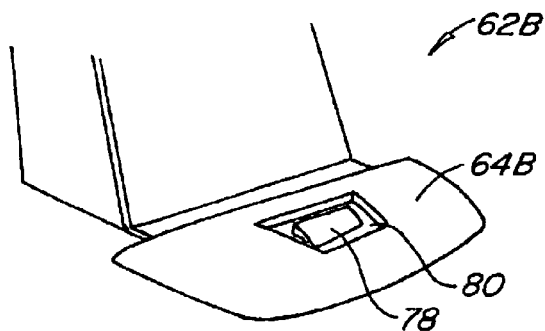
FIG. 15

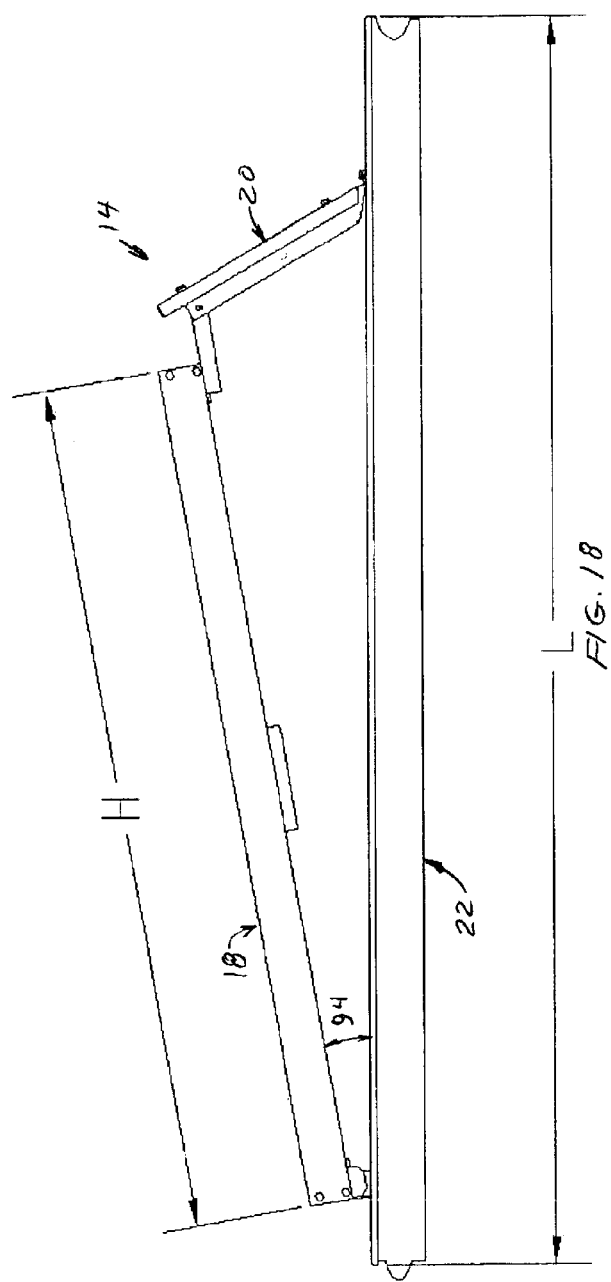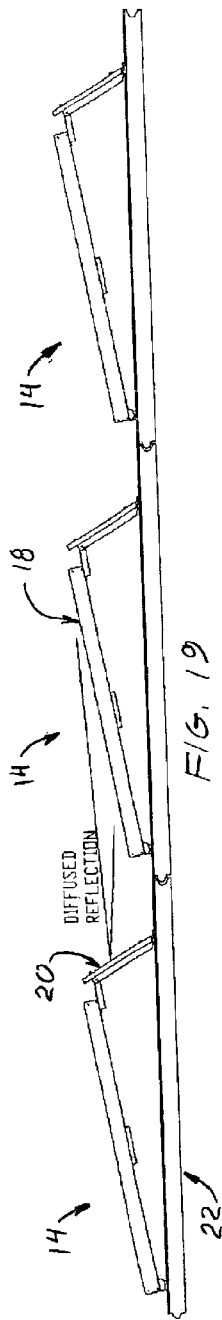

INCLINED PHOTOVOLTAIC ASSEMBLY

CROSS-REFERENCE TO OTHER APPLICATIONS

This is a continuation-in-part of U.S. patent application Ser. No. 09/902,476 filed Jul. 10, 2001, now U.S. Pat. No. 6,534,703, entitled Multi-Position Photovoltaic Assembly. See also U.S. patent application Ser. Nos. 09/902,493; 09/902,464; and 09/902,472 —each filed on Jul. 10, 2002— now U.S. Pat. Nos. 6,570,084; 6,495,750 and 6,501,013, respectively.

BACKGROUND OF THE INVENTION

Air moving across an array of photovoltaic (PV) assemblies mounted to the roof of a building, or other support surface, creates wind uplift forces on the PV assemblies. Much work has been done in the design and evaluation of arrays of PV assemblies to minimize wind uplift forces. See U.S. Pat. Nos. 5,316,592; 5,505,788; 5,746,839; 6,061,978; and 6,148,570. Reducing wind uplift forces provides several advantages. First, it reduces the necessary weight per unit area of the array. This reduces or eliminates the need for strengthening the support surface to support the weight of the array, thus making retrofit easier and reducing the cost for both retrofit and new construction. Second, it reduces or eliminates the need for the use of roof membrane- (or other support surface-) penetrating fasteners; this helps to maintain the integrity of the membrane. Third, the cost of transporting and installing the assembly is reduced because of its decreased weight. Fourth, lightweight PV assemblies are easier to install than assemblies that rely on ballast weight to counteract wind uplift forces. Fifth, when designed properly, the assembly can serve as a protective layer over the roof membrane or support surface, shielding from temperature extremes and ultraviolet radiation.

SUMMARY OF THE INVENTION

A first aspect of the invention is directed to a multiple position photovoltaic (PV) assembly, for use on a support surface, comprising a base, a PV module having first and second PV module ends and a deflector having first and second deflector ends. The assembly also comprises means for placing the PV module and deflector at shipping and inclined-use states with the PV module placeable at shipping and inclined-use angles relative to the base, and the deflector placeable at deflector shipping and deflector inclined-use angles relative to the base. The second PV module and deflector ends define a gap therebetween when the PV module and deflector are at their respective inclined-use angles. The assembly may comprise a side deflector extending generally between the base, an edge of the PV module and an edge of the deflector when the PV module and deflector are in the inclined-use state.

A second aspect of the invention is directed to a multiple position photovoltaic (PV) assembly, for use on a support surface, comprising a base, a PV module having first and second PV module ends and a deflector having first and second deflector ends. A living hinge secures the PV module to the base so that the PV module is placeable at shipping and inclined-use angles relative to the base. A coupler movably connects the second PV module end to the second deflector end so that the deflector may move relative to the PV module between deflector shipping and deflector inclined-use angles relative to the base. A deflector connector secures the deflector to the base thereby placing the PV module and deflector in an inclined-use state with the PV module at said inclined-use angle and the deflector at said deflector inclined-use angle. The second PV module and second deflector ends define a gap therebetween when at their inclined-use angles.

A third aspect of the invention is directed to a multiple position photovoltaic (PV) assembly, for use on a support surface, comprising a base, a PV module having first and second PV module ends and a deflector having first and second deflector ends. The assembly also comprises a support structure supporting (a) the PV module at shipping and inclined-use angles relative to the base, and (b) the deflector at deflector shipping and deflector inclined-use angles relative to the base. The support structure comprises a living hinge, securing the first PV module end to the base so that the PV module is placeable at said shipping and inclined-use angles, and a deflector connector, securing the first deflector end to the base so that the deflector may move between said deflector shipping and deflector inclined-use angles relative to the base.

A fourth aspect of the invention is directed to a PV assembly comprising a base, a PV module having first and second PV module ends and a deflector having first and second deflector ends. The PV module and the deflector are mounted to the base with: the PV module at an inclined-use angle relative to the base, the inclined-use angle being an acute angle with the PV module extending away from the base and towards the deflector, and the deflector at a deflector inclined-use angle relative to the base, the deflector inclined-use angle being an acute angle with the deflector extending away from the base and towards the PV module. The deflector comprises an outer surface having a solar reflectivity of at least about 0.2, and preferably of at least about 0.7, whereby solar radiation contacting the outer surface may be redirected to an adjacent PV module to increase the power output of the adjacent PV module.

A fifth aspect of the invention is directed to a PV assembly comprising a base having a base width and a base length L, a PV module having a module width and first and second PV module ends defining a module length H therebetween, and a deflector having first and second deflector ends. The PV module and the deflector are mounted to the base with: the PV module at an inclined-use angle relative to the base, the inclined-use angle being an acute angle with the PV module extending away from the base and towards the deflector, and the deflector at a deflector inclined-use angle relative to the base, the deflector inclined-use angle being an acute angle with the deflector extending away from the base and towards the PV module. The inclined-use angle of the PV module is about 2° to 15°. A ground cover ratio of H/L is about 0.6 to about 0.8.

A sixth aspect of the invention is directed to a PV assembly comprising a base and a PV module mounted to the base to overlie the base. The base comprises a foam body having an upper surface, a lower surface and a peripheral edge, a first moisture barrier at the upper surface, and a second moisture barrier at the lower surface. The foam body may comprise a closed-cell foam. At least one of the first and second moisture barriers may comprise means for mitigating the degradation of the thermal insulation properties of the foam body due to diffusion of moisture into the foam body. The first moisture barrier may comprise an impermeable cover and the second moisture barrier may comprise a skin formed on the lower surface of the foam body.

Various features and advantages of the invention will appear from the following description in which the preferred embodiments have been set forth in detail in conjunction with the accompanying drawings.

BRIEF DESCRIPTION OF THE DRAWINGS

FIG. 2 is a side view of a PV assembly of FIG. 1 in the inclined-use state;

FIG. 3 is a side view of the PV assembly of FIG. 2 in an initial, as-assembled state;

FIG. 4 is a side view of the PV assembly of FIG. 2 in a low profile, shipping state;

FIG. 5 is an isometric view of the living hinge of FIG. 3;

FIG. 10 is enlarged view of the deflector connector of FIGS. 1 and 2;

FIG. 11 is a cross-sectional view of the deflector connector illustrating the positioning of the deflector extension within the tab cavity;

FIGS. 12 and 13 illustrates an alternative embodiment of the deflector connector of FIGS. 10 and 11 in which an opening in the base is defined by a number of spring fingers into which an opening engagement element, extending from the first deflector end, is inserted;

FIGS. 14 and 15 are simplified side and overall views of a further embodiment of the deflector connector of FIGS. 10 and 11 in which the deflector extension comprises a resilient catch which engages within an opening in the tab when the deflector extension is properly seated within the tab cavity;

FIG. 18 is a side view of a PV assembly illustrating the dimensions used to calculate the ground cover ratio; and FIG. 19 illustrates solar radiation being reflected from the rear deflector of one PV assembly onto the PV module of an adjacent PV assembly.

DESCRIPTION OF THE SPECIFIC EMBODIMENTS

Figure 1:
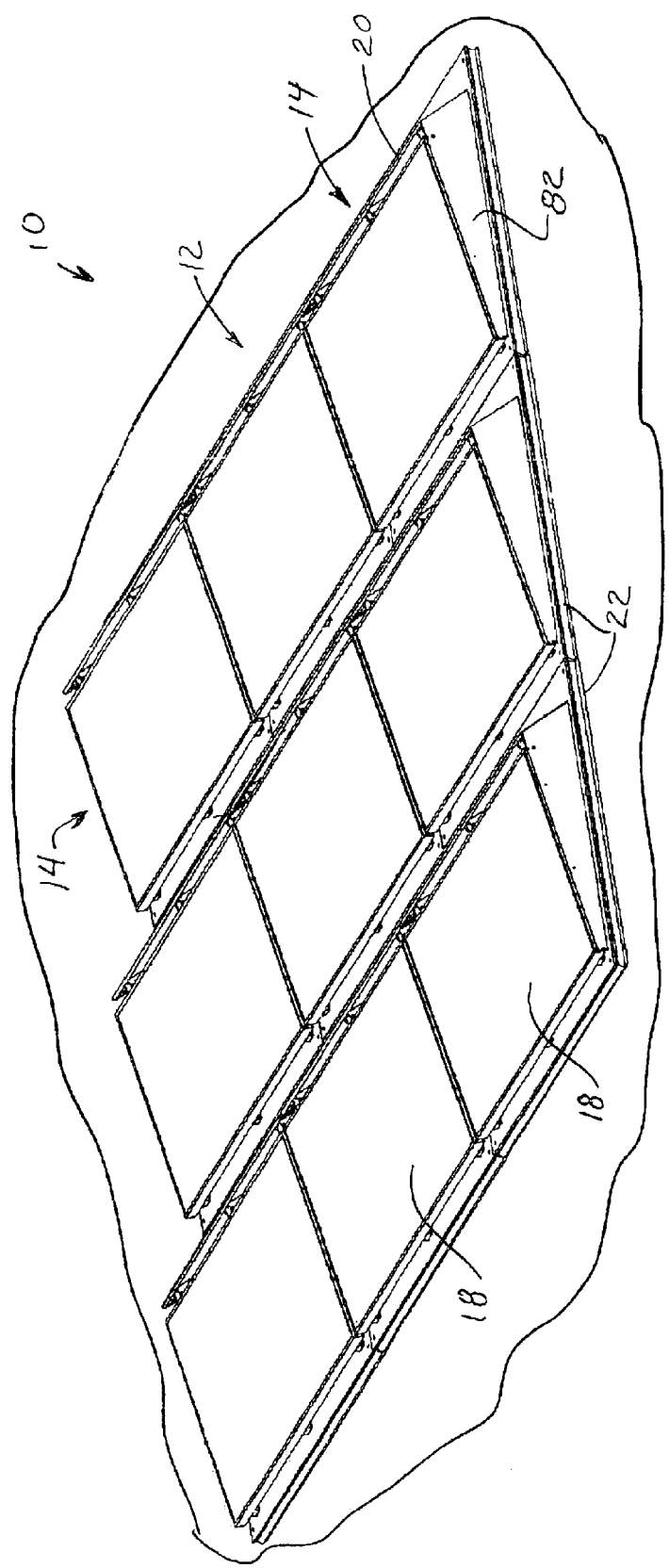
FIG. 1 is an overall view showing an array of PV assemblies in their inclined-use states mounted to a support surface.

FIG. 1 illustrates a PV system 10 comprising an array 12 of PV assemblies 14 mounted to a support surface 16. The support surface is typically a horizontal or an inclined roof of a building or other structure.

As shown in FIGS. 2–11, each PV assembly 14 comprises a PV module 18, a rear deflector 20 and a base 22. Base 22 comprises a main body 24, which may be made of thermally insulating foam, such as polystyrene, by DOW Chemical, or Noryl PPO (polyphenylene oxide) by GE Plastics, and a base cover 26. It is preferred that main body 24 be made of a closed cell foam, such as polystyrene, to help prevent absorption of water, which would degrade its thermal insulating properties. However, even closed cell foam is subject to the diffusion of water into the foam. The diffusion of water along the peripheral edge of main body 24 does not appear to create a significant degradation in the thermal performance. Cover 26 may provide an effective barrier to water diffusion into the upper surface of main body 24. However, it may be useful to provide a moisture barrier along the lower surface 27 of main body 24 to help prevent such moisture diffusion.

The moisture barrier along lower surface 27 may be an impermeable material, such as metal (aluminum, stainless steel, Galvalume® or Zincalume®, or painted plain steel), plastic (such as Dow Saran®), latex-modified mortar, or impermeable waterproof coating (such as a polymeric or ceramic coating), adhered to the bottom surface of the foam. This layer would prevent the diffusion of water molecules into the foam cellular structure under certain ambient conditions. The skin created on the surface of a sheet of polystyrene (or other appropriate material from which main body 24 is made) may be left intact on lower surface 27 of the foam, because the skin can act as an effective moisture barrier. The skin may be as extruded, that is with the original closed-cell surface that is created during the extrusion of the polystyrene. The skin may also be created by, for example, cutting the foam with a hot-wire or hot-knife process whereby the foam surface is sealed by localized surface melting. Other applications of heat and/or chemicals causing localized surface "melting" may be used as well.

While the diffusion moisture barriers are intended to prevent moisture from entering main body 24 by diffusion, some moisture may still diffuse into main body 24 due to, for example, imperfect design, manufacture or assembly of the components or imperfect adhesion. Cover 26 may be modified to mitigate moisture that has entered in main body 24 due to diffusion. This could be accomplished by utilizing a permeable cover 26 as opposed to a cover that is impermeable to moisture (such as solid metal or plastic). Such a permeable cover could be designed to be impermeable or effectively impermeable to water but permit air and water vapor to pass therethrough, similar to what occurs with breathable rainwear, thus reducing the amount of moisture within main body 24. A permeable top layer could also be mortar, perforated metal or plastic, gravel, or concrete pavers. In addition, the top surface of main body 24 may be modified to mitigate moisture picked-up due to diffusion. Channels, grooves or other geometry may be created on the top surface of main body 24 to create an escape pathway for moisture that has diffused into the main body. In this case, cover 26 could still be applied (most likely adhered) to the top surface of main body 24; however the low point of the channels or grooves would allow ambient air circulation to pick up excess moisture from the main body. The pattern of any adhesive application to the top surface of main body 24 may be modified to mitigate moisture picked-up in the main body due to diffusion. If the adhesive is applied in discrete locations (as opposed to a continuous cover), a path for moisture egress would be created. In this case, a top cover could still be applied (most likely adhered) to the top surface of the foam, however the areas with no adhesive would allow ambient air circulation to pick up excess moisture from the foam. Also, a sacrificial layer of, for example, foam could be adhered to the bottom surface of main body 24. In this case, an impermeable layer or air gap would be maintained between the sacrificial foam and main body 24. The impermeable layer could be, for example, an adhesive, metal, plastic, latex-modified mortar, or polymeric or ceramic coating.

This moisture barrier aspect of the invention may be used with other types of solar assemblies, such as those disclosed in U.S. Pat. Nos. 5,316,592; 5,505,788; 5,746,839; 6,061, 978 and 6,148,570.

Base cover 26 may serve several functions, including adding strength to base 22, protecting main body 24 from degradation due to exposure to sunlight, fire protection, and also permitting adjacent bases to be securely fastened to one another so to keep them from separating and thus losing the benefits of being interengaged. Base cover 26 may be an electrically conductive sheet metal cover made of polyvinylidene fluoride (PVDF) resin-coated metal. PVDF resin is available from ATOFINA Chemicals, Inc of Philadelphia, Pa. as KYNAR® polyvinylidene fluoride (PVDF) resin. Alternatively, base cover 26 could be made of, for example, galvanized steel, steel, Galvalume®, Zincalume®, or aluminum. Making cover 26 electrically conductive permits covers to act as a ground path. Cover 26 may have an electrically insulating surface coat of, for example, PVDF resin, Noryl PPO, ASA 606 Acrylic paint by Colloid Research, Inc., or ceramic filled resin coatings by ICS Technologies or EP21LV epoxy by Master Bond Inc. Alternatively, cover 26 may be electrically non-conducting, such as Noryl PPO, ASA 606 Acrylic paint, ceramic filled resin, or other non-conducting material. Presently, cover 26 is made of Galvalume® or Zincalume® AZ 50 steel coated on one side by Silicon Modified Polyester Paint (preferably Akzo Nobel #827-35W018-600A) and on the other by an epoxy backer (preferably Akzo Nobel #826-40W018-129A)

The first, lower PV module end 28 is secured to base 22 by a module connector 30. Module connector 30 is preferably a one-piece, living hinge type of connector. As seen best in FIGS. 5–7, module connector 30 comprises a base member 32, secured to base cover 26 of base 22 by, for example, screws (not shown), a module member 34, secured to PV module 18 by, for example, a bolt and deformed thread flange nut, and a connector strip 36, connecting base member 32 and module member 34 along flexible edges 38, 40. Module connector 30 is typically subjected to a limited number of flexings. Therefore, it has been found that module connector 30 may be made of, for example, strong but relatively low cost corrosion-resistant sheet metal, as opposed to more expensive conventional hinges or other pivot couplings.

Figure 8:
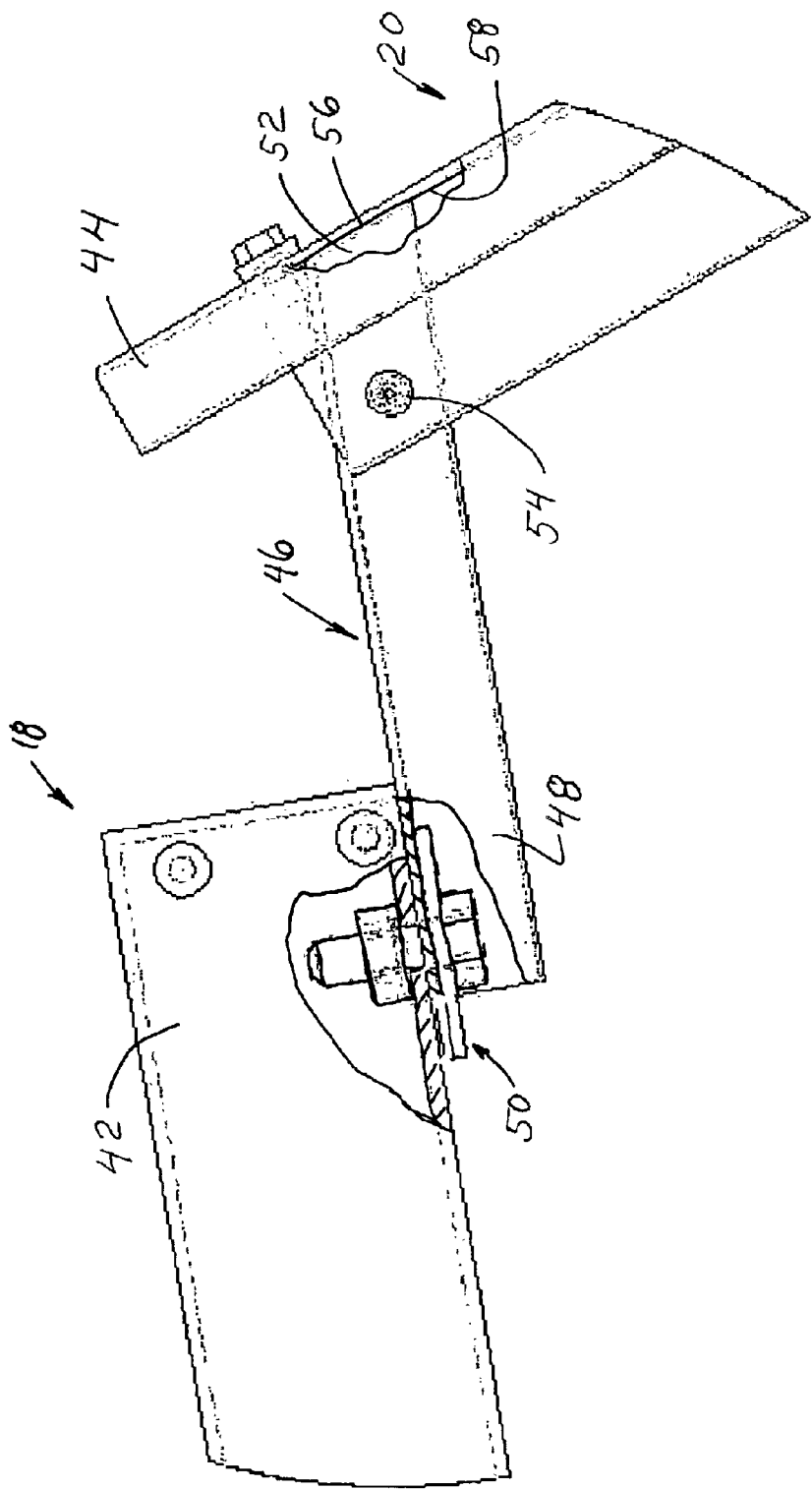
FIGS. 8 and 9 are enlarged views of the second PV module ends of FIGS. 2 and 4 respectively illustrating the movement of the coupler relative to the PV module and the deflector.
Figure 9:
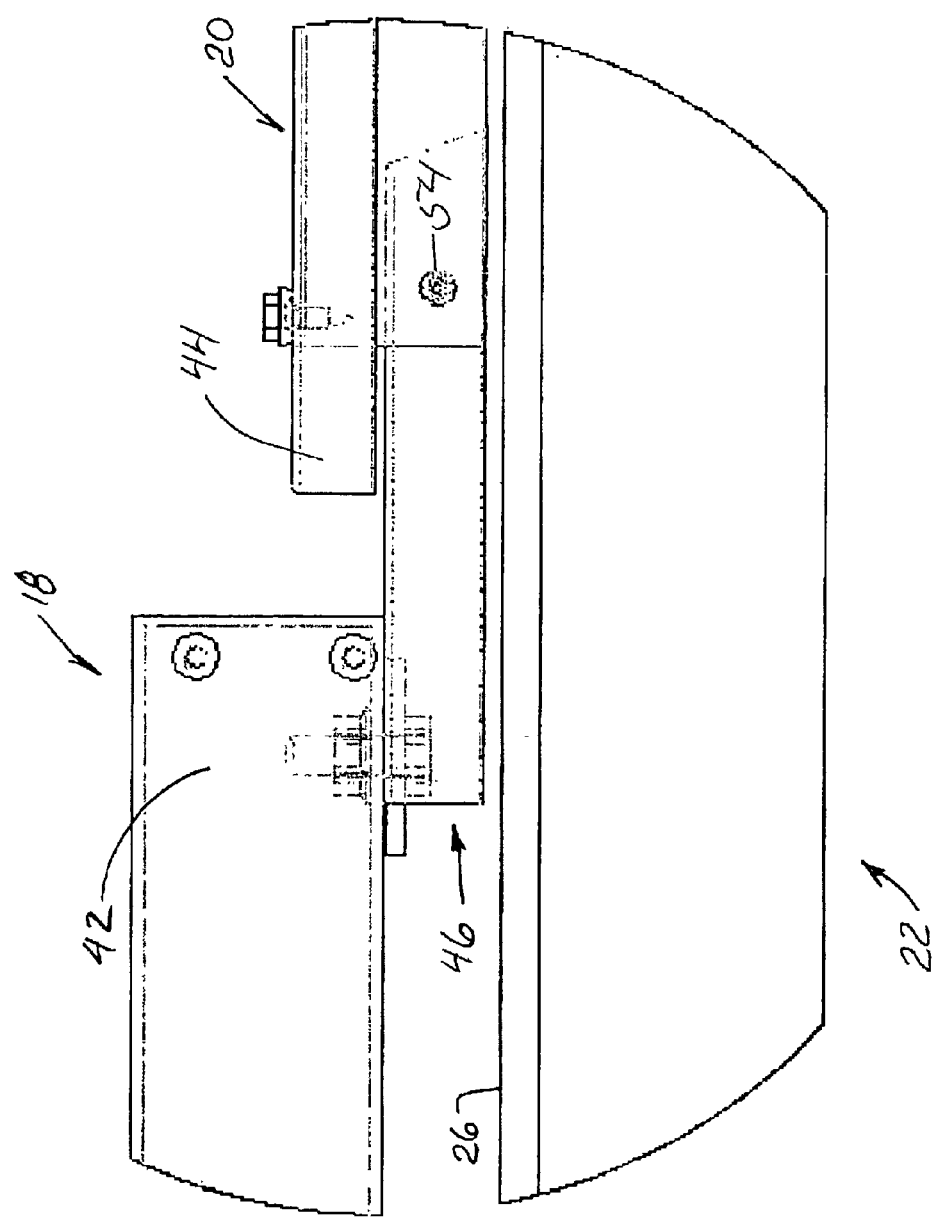

The second, upper PV module end 42 is connected to the second, upper deflector end 44 by a coupler 46. See FIGS. 8 and 9. One end 48 of coupler 46 is secured to second PV module end 42 by a nut, bolt and washer assembly 50 while the other end 52 is pivotally mounted to second deflector end 44 by a pivot 54. The relative pivotal movement between deflector 20 and coupler 46 when moving from relatively flat, shipping state of FIGS. 4 and 9 to the inclined-use state of FIGS. 2 and 8 is limited by the engagement of the outer edge 56 of end 52 with an inner surface 58 of deflector 20.

The first, lower deflector end 60 is secured to base 22, thus placing PV assembly 14 in the inclined-use state of FIG. 2, using deflector connector 62. Deflector connector 62 includes a tab 64, formed from the base cover 26, defining a tab cavity 66 and having an access opening 68. The lower end 70 of a deflector extension 72 is inserted through opening 68 and into tab cavity 66. The PV assembly 14 is secured in the inclined-use state using, for example, a self-tapping screw 74 passing through a hole 76 in tab 64 and through lower end 70 of deflector extension 72.

FIGS. 12 and 13 illustrate a deflector connector 62A. Deflector connector 62A is a first, tool-less alternative embodiment of the deflector connector of FIGS. 10 and 11 in which a pair of holes 76A are formed in base cover 26. Each hole 76A is defined by a number of spring fingers 77. The lower end 70A of deflector extension 72A acts as an opening engagement element as it is pressed into and through an associated hole 76A causing spring fingers 77 to securely engage lower end 70A. Removal of lower end 70A from hole 76A may require the use of a special tool. However, lower end 70A may be threaded so that it may be simply forced axially into hole 76A but removed from hole 76A by the use of a screwdriver or other appropriate tool. FIGS. 14 and 15 are simplified side and overall views of a deflector connector 62B. Deflector connector 62B is a second, tool-less embodiment of the deflector connector of FIGS. 10 and 11 in which the lower end 70B of deflector extension 72B comprises a resilient catch 78 which passes into and engages an opening 80 in tab 64B when the lower end 70B of deflector extension 72B is properly seated within the tab cavity 66. The use of tool-less deflector connectors can simplify installation and also help deter the unauthorized removal of components of PV assembly 14 from base 22.

Figure 16:
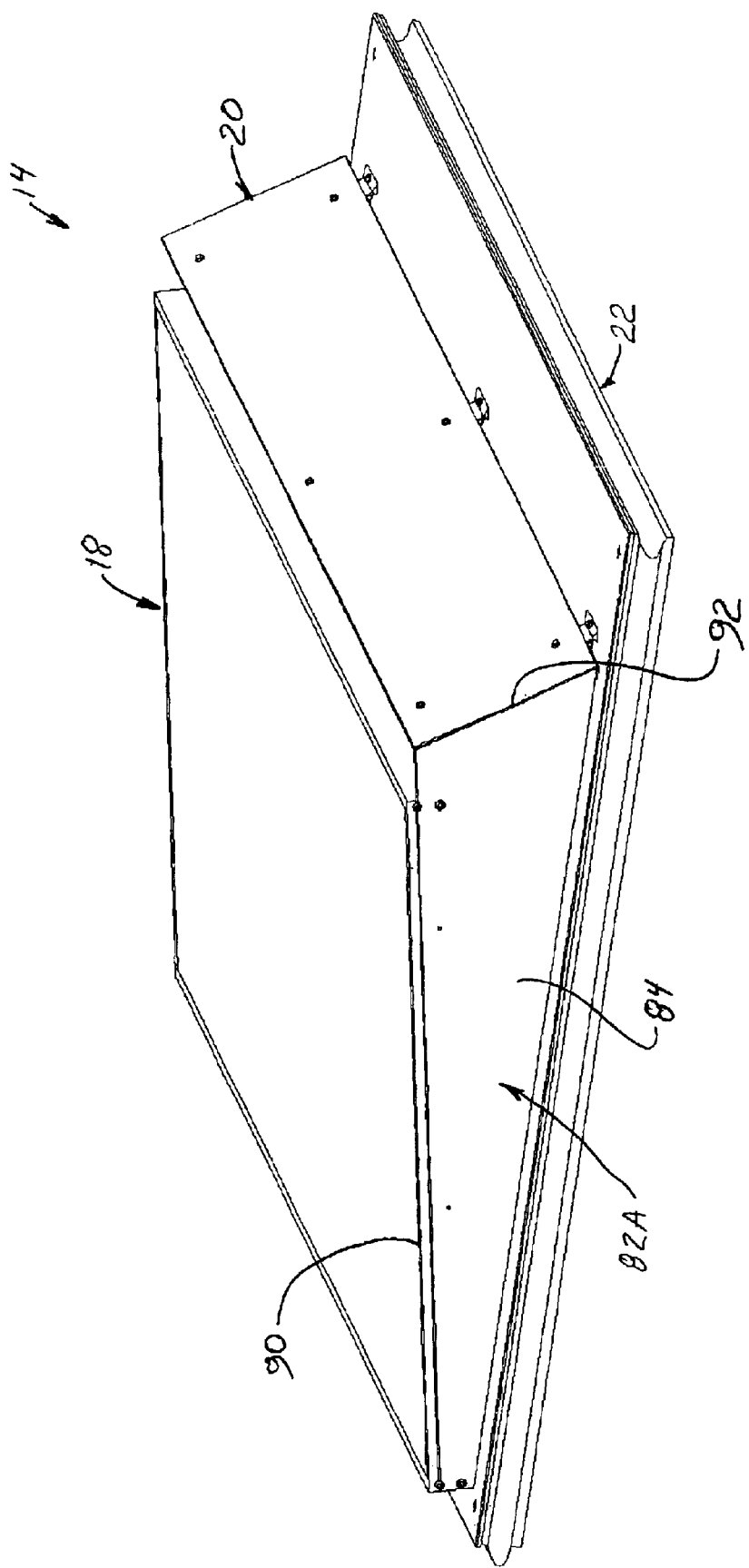
FIG. 16 is an overall view of a PV assembly of FIG. 1 including a side deflector extending generally between the base, the edge of the PV module and the edge of the rear deflector.
Figure 17:
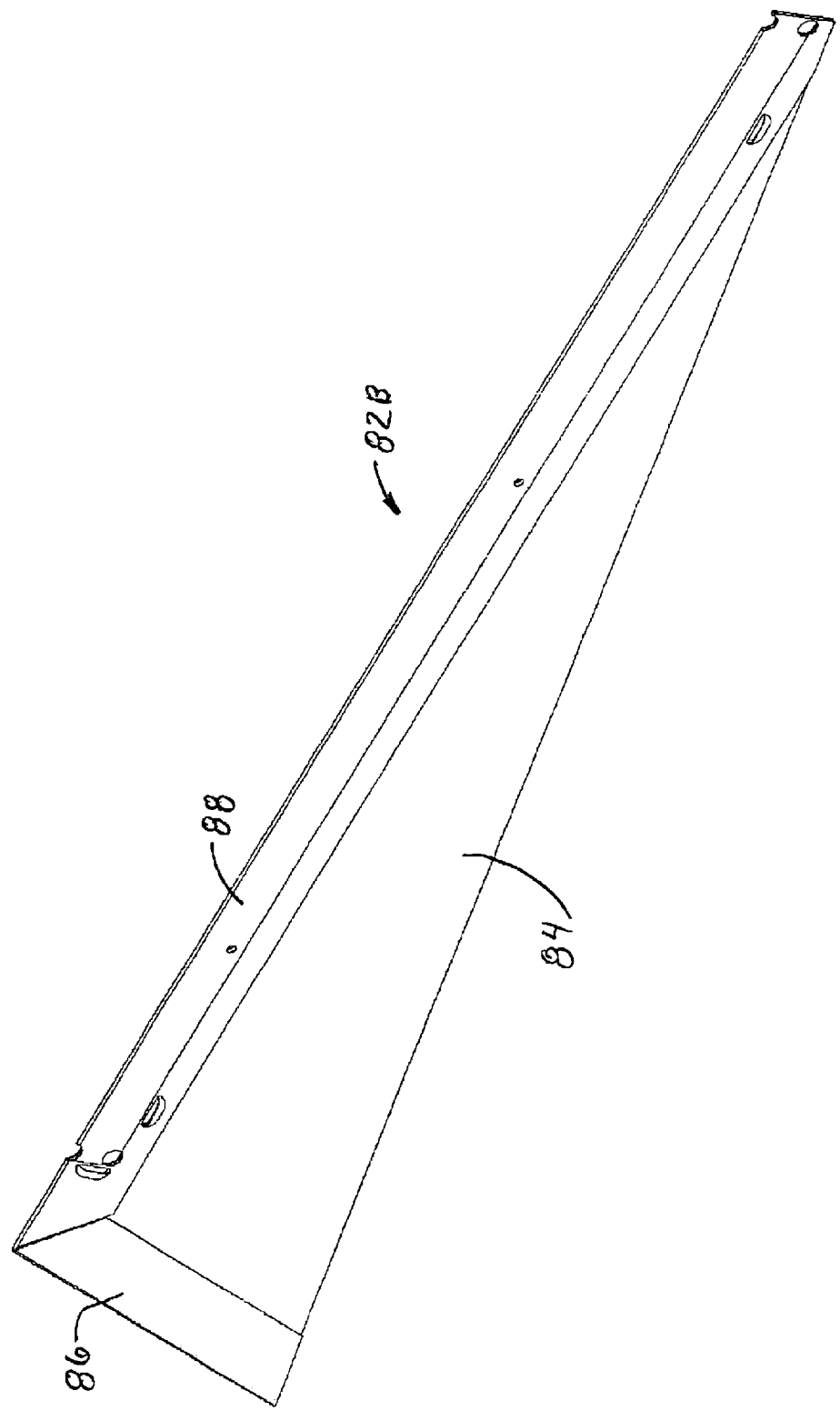
FIG. 17 illustrates the inside of the left-side deflectors.

FIG. 1 illustrates an array 12 of PV assemblies 14 including three rows of PV assemblies 14. While each PV assembly comprises a rear deflector 20, side deflectors 82 (see FIG. 1,) specifically right-side and left-side deflectors 82A and 82B (see FIGS. 16 and 17), are typically only found mounted to the outside edges of the PV assemblies 14 at the end of each row. Side deflectors 82A and 82B each include a wedge-shaped main panel 84, a deflector flange 86 and a base flange 88, deflector flange 86 being secured beneath deflector 20 and base flange being mounted to base cover 26 of base 22. Note that in FIGS. 1 and 16 the outside of right-side deflectors 82A are illustrated while FIG. 17 illustrates the inside of left-side deflectors 82B. Side deflectors 82A extend between an edge 90 of PV module 18, an edge 92 of deflector 20 and base 22. Side deflectors 82B extend between corresponding elements at the opposite ends of the rows of PV assemblies 14. Side deflectors 82A and 82B are used to prevent wind gusts from entering the array from the side, which in turn, prevents uplift on or sliding of the array.

PV module 18 is oriented at a first angle 94 to base 22, first angle 94 typically ranging from 2°–30°. Deflector 20 is oriented at a second angle 96 to base 22, second angle typically in ranging from about 20°–70°. In the disclosed embodiment first and second angles 94, 96 are predetermined angles. The appropriate angles will depend on various factors including the latitude, any slope of support surface 16, aesthetics, wind uplift, drainage, roof space, and cost. In some cases it may be desired to allow one or both of angles 94, 96 to be adjustable. This may be achieved by, for example, providing a number of positions along base 22 at which lower end 68 of deflector 20 to may be secured to base 22 or by changing the height of deflector 20. A gap 97, typically about 1–12 cm, and preferably about 2.5–7.5 cm, is formed between upper ends 42, 44 when assembly 14 is in the inclined-use state. Also, the heights of upper ends 42, 44 are about the same when in the inclined-use state.

The design of PV system 10 necessarily entails a trade-off between the angle of inclination of PV module 18 (that is, first angle 94) and the ground cover ratio H/L; see FIG. 18. For example, optimizing the selection of first angle 94 to maximize the incident solar radiation on PV module 18 (typically considered to be achieved by making first angle 94 equal to the latitude at the site) may require a reduction in the ground cover ratio to keep PV modules 18 of one row from shading the PV modules of an adjacent row; this creates a substantial limit on the total area of all the modules 18 for a particular support surface 16. While this may not be a problem when PV system 10 is mounted on the ground, when PV system 10 is mounted to the roof of a building or other structure, the total available area is limited. It has been found that selecting first angle 94 to be between about 2° and 15° and the ground cover ratio to be between about 0.6 and 0.8 yields and increase in power generated over a year of about 2% to 7% when compared with a 0° angle 94 at a 37.37° latitude (San Francisco, Calif.). In one preferred embodiment first angle 94 is about 10° and the ground cover ratio is about 0.7. These ranges of first angles 94 and ground cover ratios are for sites having a latitude of about 29° to 45° and more preferably about 33° to 41°.

It has been found that the amount of energy generated annually can be increased by, for example, about 1 percent by making the outer surface 96 of rear deflector 20 have a high level of solar reflectivity, preferably above about 0.2 and more preferably above about 0.7. As suggested in FIG. 19, this increase in solar energy generation is caused by the reflection of solar radiation from the rear deflectors 20 of one row onto the PV modules 18 of the an adjacent row.

The interengagement of adjacent PV assemblies 14 is through the use of tongue and groove interengagement elements 98, 100 formed in main body 24 of each base 22 and, alternatively, or in addition, by mechanically fastening covers 26 to one another using appropriate fasteners. One or more radiant barriers may be used between or against PV module 18 and base 20. The use of radiant barriers, typically low emissivity (low-e) films, is described in more detail in U.S. Pat. No. 6,061,978. The use of thermal insulation in conjunction with PV modules, as is described in the following U.S. Pat. Nos. 5,316,592; 5,505,788; 5,746,839; and 6,148,570, may be desirable.

Array 12 may be surrounded by perimeter elements secured to one another so to create a belt-like perimeter assembly. A perimeter assembly may help maintain the spatial integrity of array 12 by further helping to prevent PV assemblies 14 from shifting or otherwise moving laterally relative to one another. A perimeter assembly may also be configured to direct air away from the lateral edges of array 12. This latter function is aided by configuring the perimeter elements with a sloped outer surface and providing the perimeter elements with an upper edge which is about equal in elevation to or above outer surface of PV module 14. Perimeter elements typically weigh about 3–52 kg per linear meter, and more preferably about 18–30 kg per linear meter.

Figure 6:
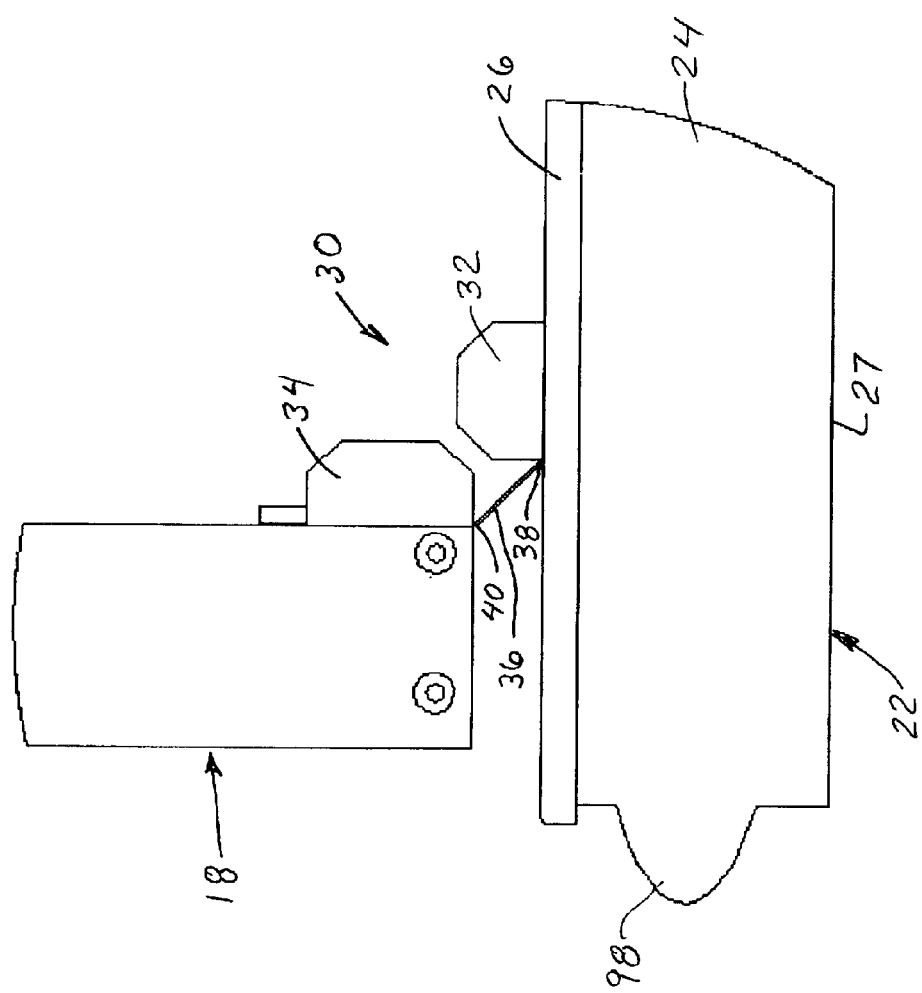
FIGS. 6 and 7 are enlarged views of the first PV module ends of FIGS. 3 and 4 respectively showing the articulation of the living hinge.
Figure 7:
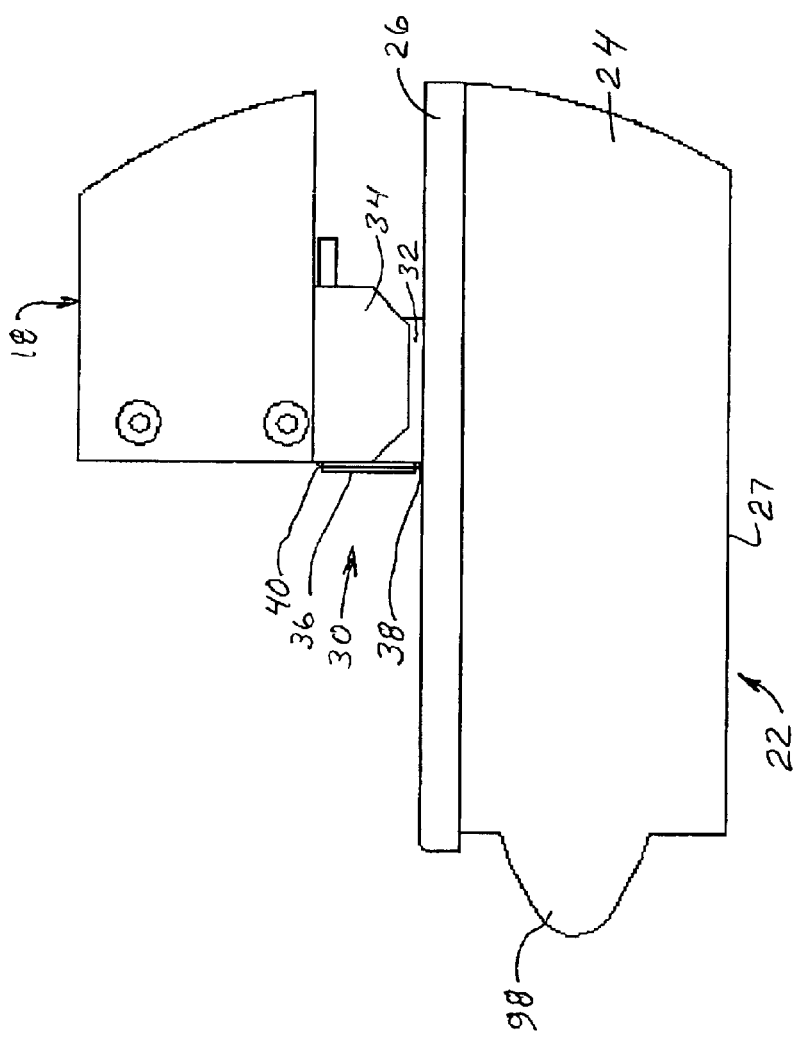

The assembly of PV assembly 14 typically proceeds generally as follows. Coupler 46 is attached to deflector 20 after which coupler 46 is secured to upper end 42 of PV module 18. Module connector 30, typically in the right angle configuration of FIGS. 3, 5 and 6, is secured to lower end 28 of PV module 18. PV module 18, together with deflector 20 mounted thereto, is then mounted to base 22 in the orientation of FIG. 3. PV module 18 is 10 pivoted downwardly (through the flexing of module connector 30) to the low profile, shipping state of FIGS. 4 and 7; deflector 20 is pivoted about pivot 54 to its low profile, shipping state of FIG. 4. When PV assembly 14 is in the "flat" or "as shipped" configuration, PV module 18 and rear deflector 20 are resting flat on base 22. A number of PV assemblies 14 in the shipping state of FIG. 4 may be stacked one on top of the other, using appropriate cushioning and spacers, for efficient transport and storage. Once PV assembly 14 is placed in the desired final position, PV module 18 is lifted up by its lateral ends 90 (typically referred to as the east and west sides) and pivoted on module connectors 30. This allows for the rotation of rear deflector 20 down until outer edge 56 contacts inner surface 58 as shown in FIG. 8. Deflector extensions 72 are then inserted into tab cavities 66 on base 22. Once properly inserted, the holes on tabs 64 and deflector extensions 72 align allowing for screws 74 to be placed through them. This results in PV assembly 14 being transformed from its shipping state of FIG. 4 to its inclined-use state of FIG. 2 and secured in place using deflector connector 62. PV assemblies 14 are placed on support surface 16 with interengagement elements 98, 100 of adjacent PV assemblies 14 engaged to form array 12. PV assemblies 14 are electrically interconnected through their junction boxes 102 by linking two wire pigtails to either an adjoining PV assembly 14 or a home run wire. Side deflectors 82A, 82B are mounted to appropriate ones of PV assemblies 14. The procedural steps and the sequence of steps may be changed to accommodate individual circumstances.

Modification and variation can be made to the disclosed embodiments without departing from the subject of the invention as defined in the following claims. For example, structure other than that disclosed above may be used for placing PV module 18 and rear deflector 20 and their low profile, shipping and inclined-use states; see, for example, FIGS. 27 and 28 of U.S. patent application Ser. No. 09/902,476 now U.S. Pat. No. 6,534,703. Also, first end 60 of deflector 20 (as well as first end 28 of PV module 18) could be mounted to base 22 using a pivoting connector; PV module 18 and deflector 20 could both be pivoted upwardly about their respective second ends 42 and 44; second ends 42 and 44 could then be fastened to one another using an appropriate coupler to secure the assembly in the inclined-use state.

Any and all patents, applications, and printed publications referred to above are incorporated by reference.

What is claimed is:

1. A multiple position photovoltaic (PV) assembly, for use on a support surface, comprising:
   a base;
   a PV module having first and second PV module ends;
   a deflector having first and second deflector ends;
   means for placing the PV module and deflector at shipping and inclined-use states with:
      the PV module placeable at shipping and inclined-use angles relative to the base, the inclined-use angle being an acute angle with the PV module extending away from the base; and
      the deflector placeable at deflector shipping and deflector inclined-use angles relative to the base, the deflector inclined-use angle being an acute angle with the deflector extending away from the base;
   said second PV module and deflector ends defining a gap therebetween when the PV module and deflector are at their respective inclined-use angle and deflector inclined-use angle.

2. The assembly according to claim 1 wherein the placing means comprises:
   a first connector pivotally connecting the PV module to the base;
   a second connector pivotally connecting the deflector to the base; and
   a coupler securing the PV module to the deflector when in their inclined-use states.

3. The assembly according to claim 1 wherein the placing means comprises:
   a module connector securing the PV module to the base;
   a coupler fastening the PV module to the deflector; and
   a deflector connector securing the deflector to the base thereby placing the PV module and deflector in an inclined-use state with the PV module at said inclined-use angle and the deflector at said deflector inclined-use angle.

4. The assembly according to claim 3 wherein the module connector comprises a hinge securing the first PV module end to the base.

5. The assembly according to claim 4 wherein the hinge comprises a living hinge.

6. The assembly according to claim 5 wherein the living hinge is made of metal.

7. The assembly according to claim 3 wherein the coupler comprises a pivot connection pivotally connecting the second PV module to the second deflector end.

8. The assembly according to claim 3 wherein the deflector connector comprises a releasable connector.

9. The assembly according to claim 3 wherein the deflector connector secures the first deflector end to the base.

10. The assembly according to claim 3 wherein the deflector connector comprises a deflector extension at the first deflector end and a tab on the base.

11. The assembly according to claim 10 wherein said tab defines a tab cavity having an opening, said deflector extension being placeable through the opening and into the tab cavity.

12. The assembly according to claim 10 wherein the base comprises a main member covered by a cover, and the tab is formed from the cover.

13. The assembly according to claim 12 wherein the cover comprises a sheet metal cover.

14. The assembly according to claim 10 wherein at least one of the deflector extension and the tab comprises a locking clip.

15. The assembly according to claim 3 wherein the deflector connector comprises:
an opening formed in a chosen one of the deflector and the base, said opening defined by a plurality of spring fingers; and
an opening engagement element, extending from the other of the deflector and the base, sized to pass into the opening and be gripped by the spring fingers.

16. The assembly according to claim 15 wherein the opening engagement element comprises a cylindrical member.

17. The assembly according to claim 3 wherein the deflector connector comprises a locking device to help prevent inadvertent disconnection of the deflector from the base.

18. The assembly according to claim 17 wherein the locking device is a tool-less locking device.

19. The assembly according to claim 1 wherein the shipping angle is about 0 degrees or about 180 degrees and the deflector shipping angle is about 0 degrees or about 180 degrees.

20. The assembly according to claim 1 wherein the base comprises a main member covered by a cover.

21. The assembly according to claim 1 wherein the gap is freely fluidly coupled to a region defined between the base and the PV module.

22. The assembly according to claim 1 wherein the deflector comprises a substantially flat, rectangular deflector surface.

23. The assembly according to claim 1 wherein said second PV module and second deflector ends are of at least substantially equal length.

24. The assembly according to claim 1 wherein:
the PV module comprises first and second PV module edges extending between the first and second PV module ends, and the deflector comprises first and second deflector edges extending between the first and second deflector ends; and further comprising:
a side deflector extending generally between the base, the first PV module edge and the first deflector edge when the PV module and deflector are in the inclined-use state.

25. The assembly according to claim 1 wherein the gap is about 1–12 cm.

26. The assembly according to claim 1 wherein the gap is about 2.5–7.5 cm.

27. A multiple position photovoltaic (PV) assembly, for use on a support surface, comprising:
a base;
a PV module having first and second PV module ends;
a living hinge securing the PV module to the base so that the PV module is placeable at shipping and inclined-use angles relative to the base, the inclined-use angle being an acute angle with the PV module extending away from the base;
a deflector having first and second deflector ends;
a coupler movably connecting the second PV module end to the second deflector end so that the deflector may move relative to the PV module between deflector shipping and deflector inclined-use angles relative to the base, the deflector inclined-use angle being an acute angle with the deflector extending away from the base;
a deflector connector securing the deflector to the base thereby placing the PV module and deflector in an inclined-use state with the PV module at said inclined-use angle and the deflector at said deflector inclined-use angle;
said second PV module and deflector ends defining a gap therebetween when at the respective inclined-use angle and deflector inclined-use angle.

28. A multiple position photovoltaic (PV) assembly, for use on a support surface, comprising:
a base;
a PV module having first and second PV module ends;
a deflector having first and second deflector ends; and
support structure supporting (a) the PV module at shipping and inclined-use angles relative to the base, the inclined-use angle being an acute angle with the PV module extending away from the base, and (b) the deflector at deflector shipping and deflector inclined-use angles relative to the base, the deflector inclined-use angle being an acute angle with the deflector extending away from the base, said support structure comprising:
a living hinge securing the first PV module end to the base so that the PV module is placeable at said shipping and inclined-use angles; and
a deflector connector securing the first deflector end to the base so that the deflector may move between said deflector shipping and deflector inclined-use angles relative to the base.

29. The assembly according to claim 28 wherein said second PV module and deflector ends define a gap therebetween when at their respective inclined-use angle and deflector inclined-use angle.

30. The assembly according to claim 29 wherein the gap is freely fluidly coupled to a region defined between the base and the PV module.

31. The assembly according to claim 28 wherein the living hinge is made of metal.

32. The assembly according to claim 28 wherein the deflector connector comprises a releasable connector.

33. The assembly according to claim 28 wherein said support structure comprises a coupler fastening the second PV module and deflector ends to one another.

34. A photovoltaic (PV) assembly comprising:
a base;
a PV module having first and second PV module ends;
a deflector having first and second deflector ends;
the PV module and deflector mounted to the base with:
 the PV module at an inclined-use angle relative to the base, the inclined-use angle being an acute angle with the PV module extending away from the base and towards the deflector; and
 the deflector at a deflector inclined-use angle relative to the base, the deflector inclined-use angle being an acute angle with the deflector extending away from the base and towards the PV module; and
the deflector comprising an outer surface having a solar reflectivity of at least about 0.2, whereby solar radiation contacting the outer surface may be redirected to an adjacent PV module to increase the power output of the adjacent PV module.

35. The assembly according to claim 34 wherein the solar reflectivity is at least about 0.7.

36. A photovoltaic (PV) assembly comprising:
a base having a base width and a base length L;
a PV module having a module width and first and second PV module ends defining a module length H therebetween;
a deflector having first and second deflector ends;
the PV module and deflector mounted to the base with:
 the PV module at an inclined-use angle relative to the base, the inclined-use angle being an acute angle with the PV module extending away from the base and towards the deflector; and
 the deflector at a deflector inclined-use angle relative to the base, the deflector inclined-use angle being an acute angle with the deflector extending away from the base and towards the PV module;
the inclined-use angle of the PV module being about 2° to 15°; and
a ground cover ratio H/L of being about 0.6 to about 0.8.

37. The assembly according to claim 36 where the inclined-use angle of the PV module is about 10° and the ground cover ratio H/L is about 0.7.

* * * * *